Patented Aug. 26, 1952

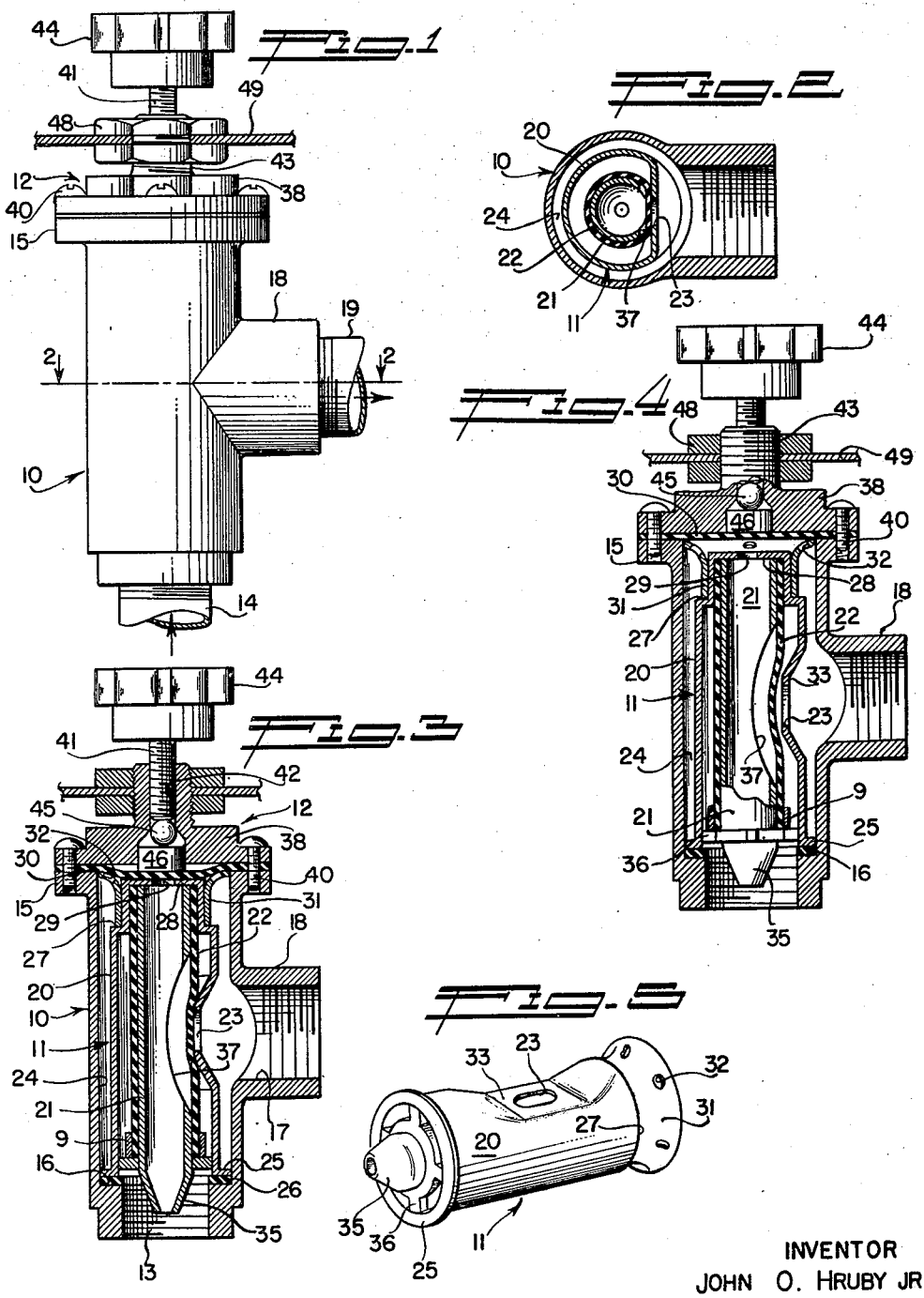

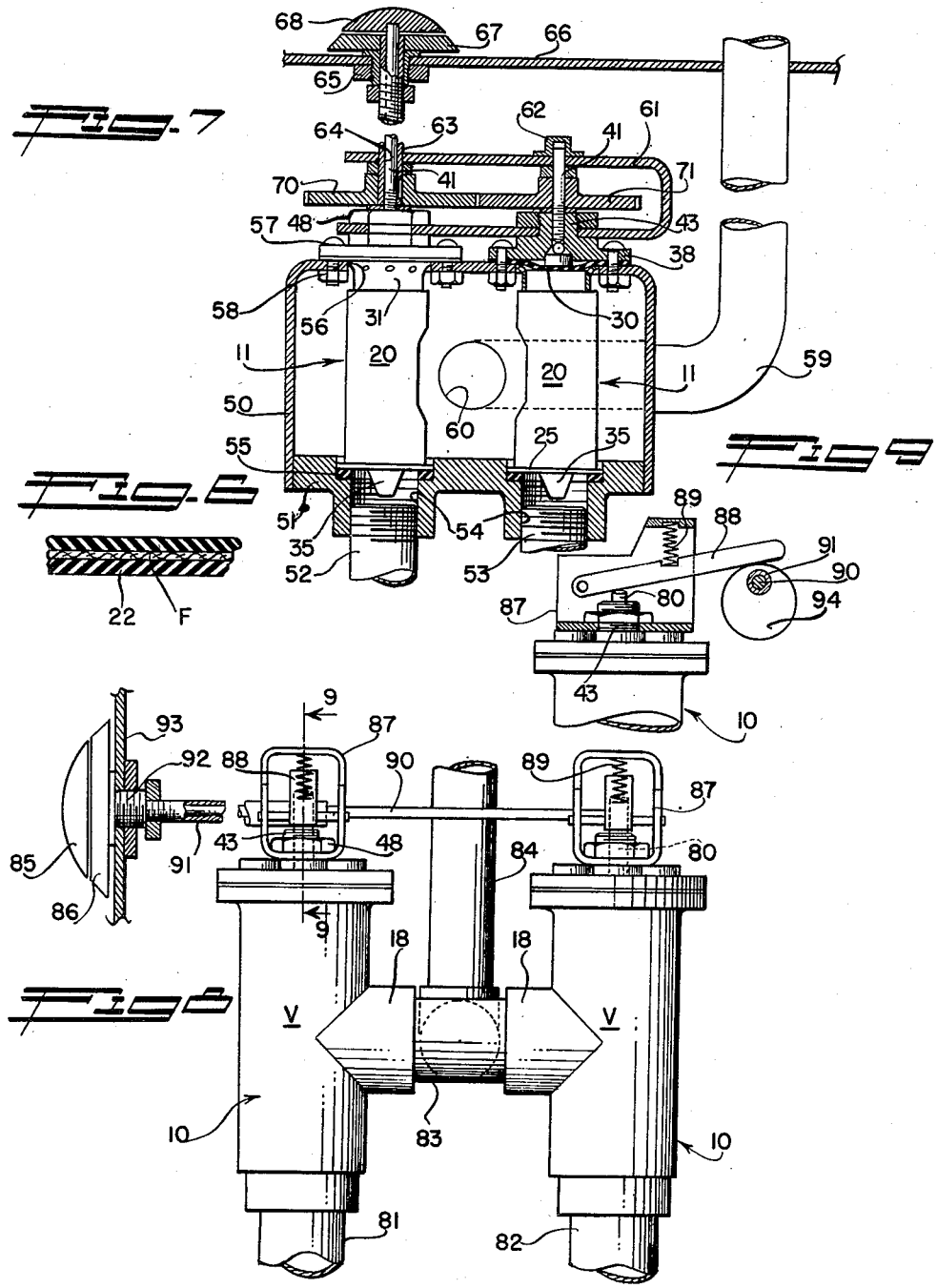

2,608,213

UNITED STATES PATENT OFFICE 2,608,213

PILOT CONTROLLED DIAPHRAGM-TYPE VALVE

John O. Hruby, Jr., Glendale, Calif.

Application July 2, 1947, Serial No. 758,630

4 Claims. (Cl. 137—606)

This invention relates to valves and relates more particularly to diaphragm-type valves adapted for both domestic and industrial applications and installations. It is a general object of the present invention to provide a simplified and improved diaphragm valve of the general class described in my copending application Serial Number 685,809, filed July 24, 1946 and now abandoned.

My copending application above referred to discloses a valve embodying a primary diaphragm adapted to directly cooperate with the wall of a ported chamber to control and throttle the flow of fluid, and a pressure bleed system for controlling the primary diaphragm which includes a pilot diaphragm adapted for operation by manual, mechanical or electrical means. The primary diaphragm of my earlier invention is a normally substantially flat member of flexible resilient material having its marginal portions secured or clamped between plates of the valve body. It is another object of the present invention to provide a valve of this class in which the primary diaphragm is tubular, or partially tubular, or is formed or supported to assume the cross section, or partial cross section, of a tube and which is arranged to be subject to controllable pilot pressure on one surface, so that its opposite surface governs a primary flow port. I have found that a flexible resilient diaphragm of this type gives a smoother, more delicate throttling action and lends itself to incorporation in a more easily fabricated, less expensive valve structure.

It is therefore another object of the invention to provide a valve of the diaphragm type which assures a smooth, accurate and sensitive control of the fluid flow throughout the entire capacity of the valve and that is extremely simple and inexpensive to manufacture. The major metal parts of the valve may be inexpensively formed of drawn or shaped sheet metal or, if preferred, may be constructed of machined or cast parts. In any case, a minimum of machining is required.

It is another object of this invention to provide a valve of the class referred to that may be easily, quickly and inexpensively repaired or reconditioned when worn. The valve includes a cartridge removably arranged in the valve body and incorporating the primary diaphragm, the ported seat with which the diaphragm cooperates to effect the primary seal or closure, and a pilot flow tube carrying the primary diaphragm and communicating with the port with which the control or pilot diaphragm cooperates. Thus the cartridge includes all of the principal parts which are subject to wear, erosion, etc. The cartridge is designed to be produced from a simple assembly of inexpensive parts so that its replacement involves a minimum expenditure and yet results in a fully reconditioned valve.

Another object of the invention is to provide a valve of the kind described that maintains an effective seal under extremely low line pressures as well as under high line pressures. The flexible resilient primary diaphragm is normally slightly bowed or deformed in such a manner as to engage and seal with a generally flat seat when there is little or no line pressure present and is firmly urged against the seat by the fluid pressure itself when the line pressure is substantial or high. This feature completely avoids the use of the conventional valve washers which are so subject to wear and eliminates leakage under all pressure conditions. The fact that the diaphragm seals with its seat by reason of its own configuration and resiliency and under the pressure of the fluid itself makes the valve extremely easy to operate and capable of fine, accurate regulation. In practice only very small forces, either manual, electrical, mechanical or hydraulic are required to move the pilot diaphragm to produce full control of the primary diaphragm. The relationship between the primary diaphragm and its substantially flat seat also avoids the necessity for close tolerances and accurately machined seat surfaces.

A further object of the invention is to provide a diaphragm type valve that does not involve ports of small diameter or of great axial extent which may be subject to obstruction by solid matter particles. There are few ports in my present valve and these are of substantial capacity and of extremely short axial dimensions.

A still further object of the invention is to provide a valve of the character referred to that lends itself to domestic lavatory and kitchen installations involving a hot water valve and a cold water valve connected into a common mixing manifold and controlled by a pair of independently operated handles or knobs arranged in adjacent coaxial relation. The installation may comprise two complete valves discharging into a common line or manifold or may have two of the abovementioned cartridge assemblies arranged in a surrounding manifold to deliver their respective fluid streams thereinto, with pilot diaphragms arranged on the manifold to control the cartridges.

Other objectives and advantages of the invention will become apparent from the following detailed description of typical preferred forms, throughout which description reference is made to the accompanying drawings, wherein:

Figure 1 is a side elevation of a valve of the invention;

Figure 2 is a transverse detailed sectional view taken as indicated by line 2—2 on Figure 1;

Figure 3 is a longitudinal detailed sectional view of the valve in the closed condition;

Figure 4 is a view similar to Figure 3 illustrating the valve in the open position;

Figure 5 is a perspective view of the cartridge assembly removed from the valve;

Figure 6 is an enlarged fragmentary sectional view of the primary diaphragm;

Figure 7 is a sectional view, with certain parts appearing in side elevation, illustrating a pair of cartridge assemblies mounted in a manifold and arranged for individual operation;

Figure 8 is a side elevation of a pair of valves and its operating means; and

Figure 9 is a fragmentary sectional view taken as indicated by line 9—9 on Figure 8.

In Figures 1 to 5, inclusive, I have illustrated a valve of the invention which may be said to comprise generally a valve case 10 adapted to be connected in a fluid handling line, a cartridge assembly 11 removably arranged in the case, and a control means or pilot diaphragm means 12.

The case 10 is a simple part which serves to house and carry the other elements of the valve and which is adapted to be interposed in or connected with the pipe or line which is to be controlled. The case 10 may be a low-cost drawn part or, if preferred, may be a suitably machined cast metal member. In the particular construction illustrated the case 10 is an elongate tubular member provided at one end with a screw thread 13 for facilitating connection with a pipe 14 and provided at the opposite end with a thickened portion or flange 15 for carrying the control means 12, as will be later described. An internal annular shoulder 16 is formed in the case 10 adjacent the thread 13, and faces axially toward the means 12. The pipe 14 forms the inlet or pressure pipe and the case 10 is provided with an outlet or discharge port 17. I have shown the port 17 formed in an internally threaded lateral boss or arm 18 which receives a threaded outlet pipe 19. In the drawings the lateral arm 18 is substantially midway between the ends of the case 10 and is approximately normal to its longitudinal axis, it being apparent that the arm 18 may have other locations and directions as the conditions of installation may require.

The replaceable cartridge assembly 11 is housed within the case 10 and comprises the primary flow controlling parts. The assembly 11 includes what I will term a shell 20, a pilot bleed or control bleed tube 21 and a primary diaphragm 22 carried by the tube 21 to govern a port 23 in the shell 20. The shell 20 is an elongate tubular member that may be constructed of formed or drawn sheet metal, of thin-walled tubing, or the like. The shell 20 is proportioned to fit within the case 10 with substantial clearance and, where it is cylindrical or round in cross section as illustrated, there is an annular space 24 left between the wall of the case 10 and the exterior of the shell. As shown in Figure 5, the shell 20 is the outer member of the cartridge assembly and the shell is proportioned so that it may be introduced through the end of the case 10 prior to installation of the control means 12. The inner or entering end of the shell has an annular outturned flange 25 which may fairly accurately fit within the case 10. A washer 26, of synthetic rubber, rubber composition or like material, is engaged on the above-described shoulder 16 of the case 10 and the flange 25 engages and seals against the washer. This seals off the lower or inner end of the abovementioned annular outlet space 24 from the interior of the shell 20.

The opposite or outer end portion of the shell 20 is reduced in diameter to present an external annular shoulder 27, and the outer end wall 28 of the shell is flat and substantially perpendicular to the longitudinal axis of the assembly. A port 29 is provided in the end wall 28 and constitutes the bleed port or pilot port that is controlled by the pilot diaphragm 30 of the means 12, as will be subsequently described. Thus the exterior surface of the end wall 28 constitutes a seat for the pilot diaphragm 30. A sleeve 31 is engaged around the reduced end portion of the shell 20 to rest on the shoulder 27. The upper or outer portion of the sleeve 31 is flared and is designed to engage with the wall of the case 10 to centralize and stabilize the cartridge assembly 11 within the case. It is preferred to have the marginal portion of the flared sleeve 31 project slightly beyond the end of the case 10 so as to be engaged by the pilot diaphragm 30. A plurality of circumferentially spaced ports or openings 32 is provided in the flared portion of the sleeve 31. This series of openings 32 communicates with the annular space 24 which in turn communicates with the main valve outlet 17. As clearly illustrated in Figures 3 and 4, the flared portion of the sleeve 31 is rounded to present a convex surface opposing the pilot diaphragm 30 and is devoid of sharp corners and edges that might injure the pilot diaphragm.

The wall of the shell 20 has the primary port 23 for conducting or delivering fluid from the interior of the shell to the space 24. The inner end of the tube-like shell 20 has direct communication with the fluid inlet 13, while, as above described, the annular space 24 has communication with the outlet 17. In accordance with the invention, the port 23 is surrounded by a substantially flat seat 33. The seat 33, which may be readily provided by suitably forming the drawn sheet metal shell 20, preferably lies in a plane tangent to a circle concentric with the longitudinal axis of the shell. As best shown in Figure 5, the metal of the shell 20 is pressed inwardly around the seat 33 and the seat is thus inset or depressed with respect to the principal wall of the shell 20. The primary port 23 is preferably elongated somewhat in the direction of the longitudinal axis of the shell 20. While the port 23 and its surrounding seat 33 may be formed in any selected wall portion of the shell, it is usually preferred to locate the port substantially midway between the ends of the shell. As shown in the drawings, the cartridge assembly 11 is oriented so that the port 23 is in direct alignment with the main valve outlet 17, although the valve is fully operative with the port facing in any direction with respect to the outlet.

The tube 21 forms a carrier for the primary diaphragm 22 and further serves to conduct fluid pressure to the above-described port 29 and to the inner surface of the primary diaphragm in such a manner that control of the port 29 causes the diaphragm 22 to control the main flow port 23. The tube 21 may be a simple tubular part that is smaller in diameter than the shell 20, to readily extend into the reduced end portion of the shell. As illustrated, the tube 21 is positioned coaxially in the shell 20 to have its inner or upper end in direct communication with the pilot bleed port 29 and to have its lower end in direct communication with the inlet pipe 14. The inlet end of the tube 21 is tapered gradually, diminishing in diameter toward its lower extremity as shown at 35. The tube 21, which may have a relatively thin wall, may be spun, drawn or die shaped, to have the tapered part 35. The part 35 serves as a separator or filter to prevent solid matter objects from entering the tube 21 and bleed system. The tapered part 35 faces upstream with respect to the flowing fluid and its sloping external surface directs the flow outwardly, leaving a relatively quiescent zone at the open reduced end of the tube. The inertia of any solid matter particles that may be in the flowing fluid causes such particles to follow the main diverted flow so that the particles do not enter the small end of the tube 21. Accordingly the filter part 35 protects the bleed system against clogging by foreign matter in the fluid being handled. The filter part 35 extends beyond the adjacent end of the shell 20 and diverts the major portion of the fluid flow into the shell 20. A centralizing spider 36 is arranged on the tube 21 adjacent the tapered filter part 35 and has spaced arms or fingers for engaging in the shell 20. The spider 36 is designed to support and centralize the lower portion of the tube 21 without offering appreciable obstruction to the flow of fluid into the shell 20.

The wall of the tube 21 has an opening 37 of substantial area which exposes the inner surface of the primary diaphragm 22 to the fluid pressure within the tube. The opening 37 is in the same side of the cartridge assembly as the primary flow port 23 and is in direct alignment with the port. As illustrated, the opening 37 may be elongated axially of the tube 21 and is considerably larger than the port 23.

The primary diaphragm 22 is a flexible resilient member arranged across the opening 37 of the tube 21, to be subjected to the pressure in the tube and to cooperate with the seat 33 in a manner to control the main flow port 23. The external surface of the tube 21 adjacent and in surrounding relation to the opening 37 is convex, being cylindrically curved in the illustrated form of the invention, and the primary diaphragm 22, or at least the portion of the diaphragm at the opening 37, is correspondingly shaped. The active portion of the diaphragm 22 is proportioned and arranged so that its curved convex outer surface engages against the flat seat 33 around the port 23 when there is no fluid pressure on the diaphragm. In other words, the configuration, position and inherent resiliency of the diaphragm 22 maintains the diaphragm in cooperation with the seat 33 and in fact may cause some slight distortion of the diaphragm by reason of its engagement with the seat when there is no fluid pressure in the valve. The primary diaphragm is, of course, subject to inward flexure into the opening 37 to uncover the port 23 and thus place the port in communication with the interior of the shell 20 and pipe 14.

In the typical embodiment illustrated the tube 21 is round or cylindrical in cross section and the primary diaphragm 22 is in the form of a tube surrounding and conforming to the tube 21. This is simply an illustrative and convenient manner of forming and assembling the parts, it being understood that only the active portions of the tube 21 and diaphragm 22 at and surrounding the opening 37 need be curved and convex as above described. Where the diaphragm 22 is tubular to surround the tube 21, its upper portion engages in the reduced part of the shell 20 to support and centralize the tube in the shell. The diaphragm 22 may be secured to and sealed with the tube 21 by a suitable cement or by vulcanizing. In addition to or as an alternative for such cementing or vulcanization, one or more metal bands 9 may be crimped around the diaphragm. I have shown one such band 9 engaged around one end portion of the diaphragm 22 and above-described reduced part of the shell 20 is crimped or pressed on the opposite end portion of the diaphragm. The diaphragm 22 is formed of rubber, rubber composition, or preferably a synthetic rubber such as "neoprene," and, as shown in Figure 6, is preferably reinforced internally with one or more layers of fabric F. It has been found that the preferred synthetic rubber diaphragm is resistant to and unaffected by most fluids and is long wearing.

The control or pilot diaphragm means 12 is adapted to be actuated to control the bleed port 29 and thereby cause actuation of the primary diaphragm 22, as will be later described. The means 12 includes a flexible resilient diaphragm 30 engaged between the head and the above-described flange 15 of the case 10. The marginal portion of the disk-like diaphragm 30 is securely clamped between the head 38 and the flange 15 by a series of spaced screws 40. The screws are passed through openings in the head 38 and pilot diaphragm and are screwed into openings in the flange 15. This arrangement assures a fluid-tight seal at the head 38 and retains the diaphragm in the operative position. As above described, the rim portion of the flared sleeve 31 terminates at or beyond the end of the case 10, and the head 38 clamping inwardly against the pilot diaphragm 30 forces the diaphragm against the sleeve to urge the entire cartridge assembly 11 inwardly so that a tight fluid seal is maintained between the washer 26 and the lower flange 25 of the shell 20. The pilot diaphragm 30 may be of the same material as the primary diaphragm 22, i. e., it may be constructed of a synthetic rubber reinforced by internal fabric. As will be seen from an inspection of Figure 4, the end wall 28 of the shell 20 is spaced inwardly from the head 38, leaving a chamber which is relatively shallow and in communication with the annular space 24 and the outlet 17 by reason of the spaced ports 32 in the sleeve 31. The diaphragm 30 is adapted to be moved across this space or chamber toward or into engagement with the wall 28 to throttle the port 29 and thus control communication of the port with the space 24 and outlet 17.

The control means 12 further includes apparatus for operating the pilot diaphragm 30. This apparatus may be manual, electrical, mechanical or hydraulic. In the simple form of the invention illustrated the operating means includes a stem 41 screw threaded into an opening 42 in a boss 43 on the head 38. The outer end of the stem 41 is provided with an operating knob or handle 44 and its inner end engages a ball 45. The inner portion of the opening 42 is enlarged in diameter to receive a slidable plunger block 46. The block 46 presents a flat end of substantial area for engaging the diaphragm 30, it being observed that the block is coaxial with and larger in diameter than the port 29. The free ball 45 engaged between the end of the stem 41 and the block 46 reduces the tendency of the block to rotate with the stem, thus eliminating wear on the pilot diaphragm 30. The ball 45 also acts as an anti-friction element to reduce the force required to turn the stem 41. The boss 43 of the head 38 is externally screw threaded and may carry spaced nuts 48 for clamping with a plate, fixture 49, or the like, to mount the valve. It will be seen that upon rotation of the handle 44 in one direction the pilot diaphragm 30 is urged toward the port 29 and upon rotation of the handle in the opposite direction the diaphragm is allowed to retract from the port.

In describing the operation of the valve it will be assumed that the pipe 14 carries fluid under pressure and that the pipe 19 is a discharge pipe communicating with the atmosphere or with a pressure that is lower than the pressure carried in the pipe 14. To close off the flow from the pipe 14, the pilot diaphragm 30 is moved against the seat or wall 28 by operation of the screw stem 41. The plunger block 46, when actuated inwardly by the stem, causes the pilot diaphragm to flatly engage against the wall 28 around the port 29 to close the port. Only a very small force is required to close the port in this manner. Upon closing of the port 29, substantially full line pressure immediately builds up in the tube 21 and this pressure is exerted against the inner side of the primary diaphragm 22 to urge the same outwardly. On the other hand, the pressure at the outer surface of the primary diaphragm 22 is less than line pressure owing to the fact that the port 23, space 24 and outlet 17 are in communication with the atmosphere. Thus the pressures at the opposite sides of the primary diaphragm 22 are unbalanced and the higher internal pressure flexes the diaphragm outwardly to seal with the seat 33. A substantial area of the diaphragm 22 is exposed to the line pressure at the opening 37 in the tube 21 so that the diaphragm is urged outwardly to come into effective sealing engagement with the seat 33 around the flow port 23. The line pressure holds the diaphragm 22 in tight engagement with the seat 33 and, as above described, the arrangement is such that a fluid-tight seal is preserved even though the line pressure is very low. It will be noted that the diaphragm 22 has sealing engagement with a substantial area of the seat 33, or with the entire seat, so that the sealing action and the wear incident thereto are well distributed.

To open the valve the screw stem 41 is rotated in a direction to allow the pilot diaphragm 30 to be moved away from the seat or wall 28 by the line pressure at the port 29. This opens the port 29 allowing fluid to flow from the interior of the tube 21 into the space 24 and outlet port 17. As a result of this the pressure in the tube 21 is reduced to bring about a balancing or partial balancing of the pressures at the opposite sides of the primary diaphragm 22. This balancing of pressures on the diaphragm 22 allows the diaphragm to flex away from the seat 33 to uncover the main flow port 23. Smooth, accurate regulation of the main fluid flow is obtained by small movement of the screw stem 41, and any desired rate of fluid flow may be obtained by regulation of the stem. I have found that the primary diaphragm 22 responds almost instantly to such regulation of the screw stem.

In Figure 7 I have shown a pair of the cartridge assemblies 11 of the invention arranged to control the flow of fluids into a mixing chamber or manifold chest 50. The two valve assemblies 11 may be identical with the assembly 11 described above, and corresponding reference numerals are applied to corresponding parts throughout the several figures. The chest 50 may be a sheet metal box-like structure provided at one side with a wall 51 that is brazed or otherwise secured and sealed in place. The wall 51 has two spaced openings 54 for receiving pipes 52 and 53 which may carry fluids of different characters or at different temperatures. For example, the pipe 52 may carry cold water and the pipe 53 may handle hot water. Washers 55 are engaged on seats at the inner ends of the openings 54 to receive the lower flanges 25 of the cartridge shells 20. The cartridges 11 are introduced through openings 56 in the upper wall of the chest 50, and their flared sleeves 31 have their peripheral edges in or above the plane of the upper surface of the chest. Heads 38 are secured to the upper wall of the chest 50 by screws 57 which thread into nuts 58 welded or otherwise fixed on the chest wall. Pilot diaphragms 30 are clamped between the heads 38 and the upper wall of the chest to extend across and close off the openings 56. The diaphragms 30 are adapted to cooperate with the seats or walls 28 to control the pilot ports 29 and engage against the sleeves 31 to hold the cartridge assemblies 11 against the washers 55. The heads 38 carry the screw stems 41, balls 45 and plunger blocks 46 for operating the pilot diaphragms 30. An outlet pipe 59 communicates with an opening 60 in a wall of the chest 50 to convey away the fluid.

The invention provides coaxial handle means for operating the two valve cartridges 11. This means includes a U-shaped bracket 61 having one arm secured on the spaced bosses 43 by the nuts 48. The stem 41 of one valve assembly 11 is journalled in an opening 62 in the other bracket arm while the screw stem 41 of the second valve assembly is elongated to extend outwardly beyond the bracket. A tubular shaft 63 is rotatable on the elongated stem 41 and is journalled in an opening 64 in the bracket 61. The outer portion of the tubular shaft 63 passes through a suitable bushing 65 on a plate or fixture 66 and carries an operating knob or handle 67. The elongated screw stem 41 which extends through the tubular shaft 63 projects beyond the end of the shaft and is provided with an operating handle 68. The two handles 67 and 68 are in coaxial relation and may be adjacent to one another at the face of the fixture 66. This constitutes a "one place" operating means for the two valve assemblies 11.

A suitable driving connection is provided between the tubular shaft 63 and the stem 41. In the construction illustrated this comprises a gear 70 keyed on the tubular shaft to mesh with a similar gear 71 keyed on the short screw stem 41. The gears 70 and 71 may be located between the arms of the bracket 61. When this gear drive is provided, it is preferred to make the screw thread of one stem 41 a right-hand thread and to make the thread of the other stem 41 a left-hand thread, so that the handles 67 and 68 may be turned in corresponding directions to cause opening or closing of their respective valve assemblies 11.

It will be seen that the structure of Figure 7 constitutes a simple, inexpensive arrangement in which hot and cold water, or the like, may be mixed for ultimate discharge from a common outlet. The two valve assemblies 11 engaged in the chest 50 make up an efficient mixing valve. It will be noted that there is no necessity to employ valve cases 10 for the assemblies 11. The assemblies 11 may be easily replaced when worn by merely withdrawing them from the chest 50 and inserting the new or replacement assemblies. The two handles 67 and 68, arranged in adjacent coaxial relation, constitute convenient means for controlling the two valve assemblies.

Figures 8 and 9 illustrate an embodiment of the invention in which two valves V discharge into a single manifold. In this arrangement the two valves V may be identical with the complete valve illustrated in Figures 1 to 6, inclusive, with the sole exception that the operating stems 80, instead of being screw threaded in the heads 38, slide or shift bodily in the heads to operate the pilot diaphragms 30. Pipes 81 and 82 communicate with the inlet ports 13 of the valve cases 10, and it may be considered that one pipe carries hot water and the other conducts cold water. A manifold pipe 83 connects or extends between the two outlet ports 17 of the valves and a single outlet pipe 84 extends from the manifold pipe 83. Thus the two valves V are manifolded to deliver the two fluids, or the hot and cold water, to a common outlet line.

I have shown a cam means for operating the valves V which includes two coaxial knobs or handles 85 and 86. A bracket 87 is secured on the boss 43 of each valve V by the nuts 48 and each bracket carries a pivoted lever 88. The levers 88 engage the outer ends of the stems 80 and are urged against the stems by compression springs 89. With this arrangement the springs 89 urge the diaphragms 30 toward the closed positions. A shaft 90 carries the abovementioned handle 85, and a tubular shaft 91 carries the handle 86. The shaft 91 surrounds and supports a portion of the inner shaft 90 and is in turn carried in a bushing 92 on the fixture or plate 93. The inner shaft 90 is longer than the shaft 91 to extend from the inner end of the tubular shaft to the more remote valve V. Cams 94 are fixed to the shafts 90 and 91 and are arranged to cooperate with the levers 88. As above described, the springs 80 urge their respective pilot diaphragms 30 to the closed positions, and the cams 94 are operable to move their respective levers 88 outwardly and thus allow the diaphragms 30 to move away from their seats 28 under the influence of the fluid pressure in the tubes 21.

It is believed that it will be apparent how the springs 89 normally hold the diaphragms 30 closed or against the seats 28 and how rotation of the handles 85 and 86 serves to open the related valves V. The user or operator, by rotating a handle 85 or 86 in one direction, merely allows the diaphragm 30 to move to an open position under the action of the fluid pressure in the tube 21 and, upon rotating the handle in the other direction, the spring 89 moves the diaphragm 30 toward its seat 28. Accordingly with this construction it is impossible for the user to apply excessive compressive forces to the pilot diaphragms 30.

Having described only typical preferred embodiments of the invention, I do not wish to be limited to the specific structures above described but wish to reserve to myself any features or modifications that may fall within the scope of the following claims.

I claim:
1. In a valve arrangement, the combination of a chest having two inlets and at least one outlet and having openings aligned with the inlets, an assembly removably inserted through each of said openings, each assembly comprising a shell seated in the chest to have one end in communication with an inlet, and having a flow port in communication with said outlet, a wall at the other end of the shell having a bleed port, a tube in the shell having an end open to the inlet and an end communicating with said bleed port, an opening in the wall of the tube aligned with the flow port, a flexible diaphragm extending across said opening of the tube and cooperating with the flow port to control said flow port and to be responsive to the pressure in the tube, and a pilot diaphragm for controlling the bleed port to vary the pressure in the tube, and means on the chest for operating the pilot diaphragm.

2. In a valve arrangement, the combination of a chest having two inlets and at least one outlet and having openings aligned with the inlets, an assembly removably inserted through each of said openings, each assembly comprising a shell seated in the chest to have one end in communication with an inlet, and having a flow port in communication with said outlet, a wall at the other end of the shell having a bleed port, a tube in the shell having an end open to the inlet and an end communicating with said bleed port, an opening in the wall of the tube aligned with the flow port, a flexible diaphragm extending across said opening of the tube and cooperating with the flow port to control said flow port and to be responsive to the pressure in the tube, and a pilot diaphragm for controlling the bleed port, heads on the chest at said openings thereof, stems movable in the heads to operate the pilot diaphragms, and coaxial adjacent handles for operating said stems.

3. In combination, a pair of valves each including a valve controlling diaphragm controlling the operation of its respective valve and a stem engaging said diaphragm for operating the diaphragm, a spring means engaging said stem for operating its respective stem in one direction, a cam means engaging each stem for operating its respective stem in the other direction, rotatable coaxial shafts attached to the cams for operating said cams, one shaft being tubular, and the other shaft extending through the tubular shaft, and adjacent handles on the coaxial shafts for turning the same.

4. A valve cartridge for use in a valve body having an inlet and an outlet and carrying a controllable pilot diaphragm, said cartridge including a shell arranged in the valve body having its interior in communication with the inlet, the shell having a side wall provided with an outflow port communicating with said outlet and having an end wall provided with a bleed port controlled by said pilot diaphragm, a bleed tube spaced within the shell and having one end engaged with said end wall of the shell so that the fluid pressure in the tube is determined by the position of the pilot diaphragm, the other end of the bleed tube having a tapering nose projecting through said shell into the inlet and provided with a reduced opening communicating with said inlet of the body, the side wall of the tube having an opening, and a flexible tubular diaphragm engaged around the bleed tube and exposed to the fluid pressure in the bleed tube by the opening in the side wall of the tube so as to be expansible into engagement with the shell to close said outflow port when said bleed port is closed.

JOHN O. HRUBY, Jr.

REFERENCES CITED

The following references are of record in the file of this patent:

UNITED STATES PATENTS

| Number | Name | Date |
|---|---|---|
| 387,799 | Moody | Aug. 14, 1888 |
| 745,027 | Stone | Nov. 24, 1903 |
| 848,739 | Gut | Apr. 2, 1907 |
| 1,151,751 | Barenz | Aug. 31, 1915 |
| 1,269,721 | Kuntny | June 18, 1918 |
| 1,444,083 | Porteous | Feb. 6, 1923 |
| 1,656,448 | Schumacher | Jan. 17, 1928 |
| 1,664,901 | Rosenbaum | Apr. 3, 1928 |
| 1,731,571 | Heare | Oct. 15, 1929 |
| 1,851,062 | Protzer | Mar. 29, 1932 |
| 2,075,740 | McKay | Mar. 28, 1934 |
| 2,149,367 | Sedlon | Mar. 7, 1939 |

FOREIGN PATENTS

| Number | Country | Date |
|---|---|---|
| 3,418 | Great Britain | of 1885 |
| 259,182 | Great Britain | of 1927 |